US012025944B2

(12) United States Patent
Tetsuno et al.

(10) Patent No.: US 12,025,944 B2
(45) Date of Patent: Jul. 2, 2024

(54) IMAGE FORMING APPARATUS

(71) Applicant: CANON KABUSHIKI KAISHA, Tokyo (JP)

(72) Inventors: Shuichi Tetsuno, Kanagawa (JP); Toshihiko Takayama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/230,813

(22) Filed: Aug. 7, 2023

(65) Prior Publication Data

US 2023/0375971 A1 Nov. 23, 2023

Related U.S. Application Data

(62) Division of application No. 18/092,589, filed on Jan. 3, 2023, now Pat. No. 11,782,377.

(30) Foreign Application Priority Data

Jan. 11, 2022 (JP) ................................ 2022-002365

(51) Int. Cl.
*G03G 21/00* (2006.01)
*G03G 21/16* (2006.01)

(52) U.S. Cl.
CPC ....... *G03G 21/0035* (2013.01); *G03G 21/169* (2013.01); *G03G 2221/0005* (2013.01); *G03G 2221/0089* (2013.01)

(58) Field of Classification Search
CPC ............. G03G 21/0035; G03G 21/169; G03G 2221/0005; G03G 2221/0089
See application file for complete search history.

(56) References Cited

U.S. PATENT DOCUMENTS

2001/0022910 A1 9/2001 Sawayama
2010/0008706 A1 1/2010 Sugiura et al.
(Continued)

FOREIGN PATENT DOCUMENTS

EP 1429209 A2 6/2004
JP H08-115031 A 5/1996
(Continued)

OTHER PUBLICATIONS

Search Report dated Jun. 5, 2023, in European Patent Application No. 22217092.0.

*Primary Examiner* — Joseph S Wong
(74) *Attorney, Agent, or Firm* — Venable LLP

(57) ABSTRACT

An image forming apparatus includes a rotatable image bearing member, a developing unit to develop an electrostatic latent image at a developing portion, a transfer unit to transfer a developer image to a recording member at a transfer portion; and a brush provided with a plurality of fibers contacting the image bearing member at downstream of the transfer portion and upstream of the developing portion in a rotational direction of the image bearing member. An average contacting pressure of the brush per one fiber to the image bearing member is smaller than a depositing force of the developer not transferred to the recording member to the image bearing member. As the brush in a state of not in contact with the image bearing member is viewed from a free end side of the fibers, an average number of the fibers included in a circumference of a diameter of 100 μm is more than one.

7 Claims, 4 Drawing Sheets

(56) References Cited

U.S. PATENT DOCUMENTS

| | | | | |
|---|---|---|---|---|
| 2011/0240340 | A1* | 10/2011 | Takanaga ........... | G03G 21/0035 174/133 R |
| 2013/0156448 | A1 | 6/2013 | Ishii | |
| 2015/0117897 | A1 | 4/2015 | Shibuya | |
| 2021/0382430 | A1 | 12/2021 | Funatani et al. | |
| 2023/0195007 | A1* | 6/2023 | Hara .................. | G03G 15/0815 |
| 2023/0195026 | A1* | 6/2023 | Kanazawa ........... | G03G 21/007 399/149 |

FOREIGN PATENT DOCUMENTS

| | | | |
|---|---|---|---|
| JP | 2000-112311 | A | 4/2000 |
| JP | 2000-112312 | A | 4/2000 |
| JP | 2004-309656 | A | 11/2004 |

* cited by examiner

IMAGE FORMING APPARATUS

This is a divisional of U.S. patent application Ser. No. 18/092,589, filed Jan. 3, 2023.

FIELD OF THE INVENTION AND RELATED ART

The present invention relates to an image forming apparatus which forms an image on a recording material.

In an electrophotographic image forming apparatus using a direct transfer method, a cleanerless method (a developing and simultaneous cleaning method) is known in which toner (developer), which is not transferred to a recording material from a photosensitive drum as an image bearing member and which remains on the photosensitive drum, is collected into a developing device in a developing portion and reused. In the cleanerless method, a reduction in the possibility of foreign matter (hereinafter referred to as paper dust) such as paper fiber and filler, which has adhered to the photosensitive drum and which may have an undesirable effect on subsequent image forming processes, is demanded. A method is described in Japanese Laid-Open Patent Application (JP-A) 2000-112312 in which a brush member, which contacts a surface of the photosensitive drum, collects paper dust on the photosensitive drum so as to reduce the amount of paper dust reaching a charging portion and the developing portion which are downstream of a transfer portion.

In a case where the brush member in the aforementioned document is used, if the brush member accumulates a large volume of toner, there is a possibility that the brush member will discharge a toner lump at some moment, such as when a contact state of the brush member changes, or when a large fluctuation in potential occurs between the brush member and the photosensitive drum. There is a possibility that the toner lump discharged from the brush member is not completely collected in the developing device and gets transferred to the recording material, which may cause an image defect.

Further, in the configuration in the aforementioned document, the brush member may be able to remove relatively large paper dust; however, there were situations in which the brush member did not sufficiently remove small-sized paper dust. There is a possibility that paper dust passing through the brush member may result in an undesirable effect on subsequent image forming processes, such as causing image defects (black spots) by obstructing a uniform charging of the surface of the photosensitive drum during a charging step.

SUMMARY OF THE INVENTION

Accordingly, the purpose of the present invention is to provide an image forming apparatus which improves the paper dust collection performance of the brush member while reducing image defects caused by toner discharge.

According to an aspect of the present invention, there is provided a n image forming apparatus comprising: a rotatable image bearing member; a developing member configured to develop an electrostatic latent image formed on the image bearing member using a developer at a developing portion; a transfer member configured to transfer a developer image developed by the developing member from the image bearing member to a developed member at a transfer portion; and a brush provided with a plurality of fibers contacting the image bearing member at a position of downstream of the transfer portion and upstream of the developing portion with respect to a rotational direction of the image bearing member, wherein the developer remaining on the surface of the image bearing member is collected in the developing portion, wherein an average contacting pressure of the brush per one fiber to the image bearing member is smaller than a depositing force of the developer remaining on the surface of the image bearing member, and wherein as the brush in a state of not in contact with the image bearing member is viewed from a free end side of the fibers, an average number of the fibers included in a circumference of a diameter of 100 μm is more than one.

Further features of the present invention will become apparent from the following description of exemplary embodiments with reference to the attached drawings.

Figure 2:
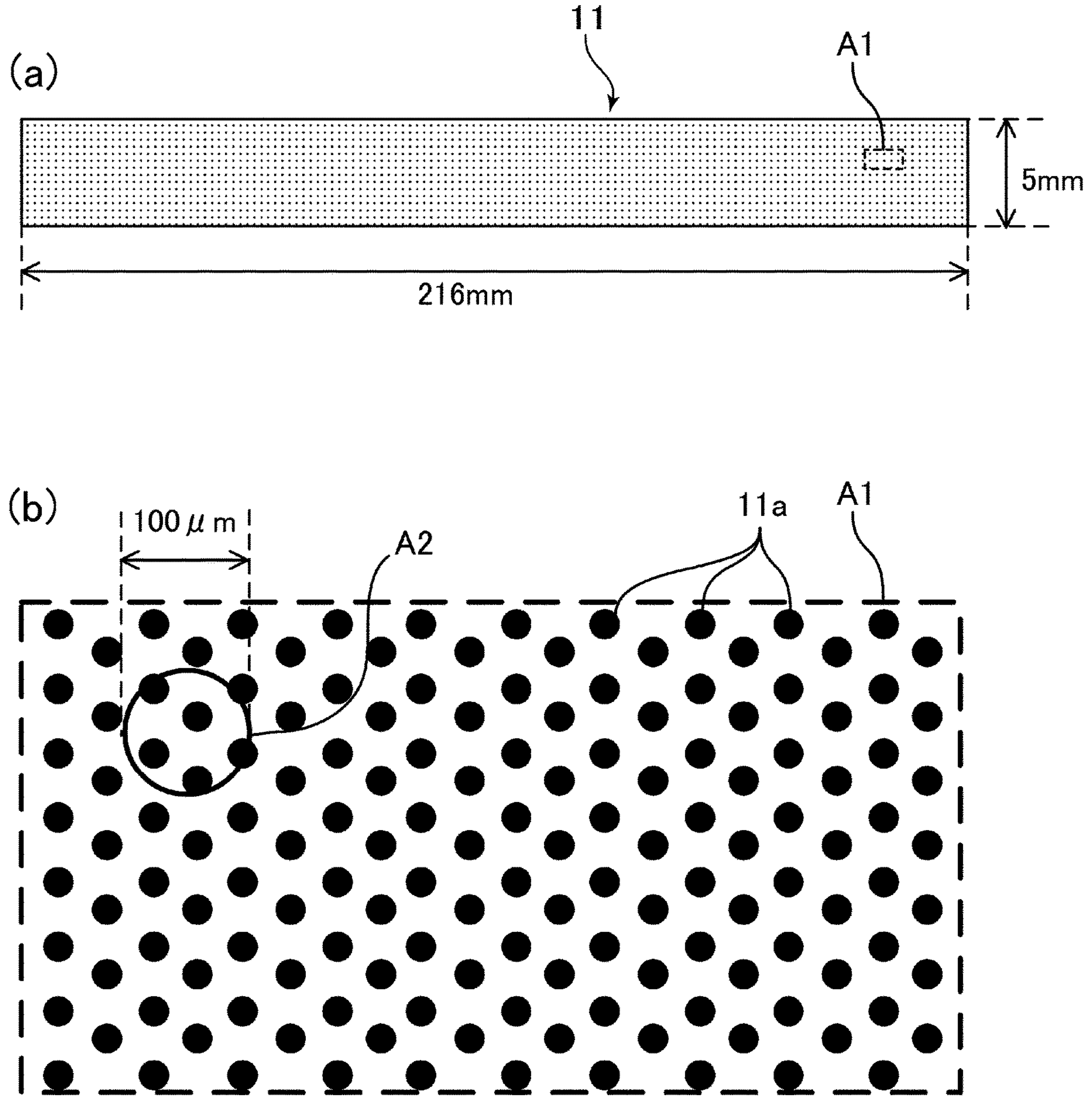

Part (a) of FIG. 2 is a pattern diagram of a brush member pertaining to the implementation form, and part (b) of FIG. 2 is an enlarged view of a portion of the brush member.

Figure 3:
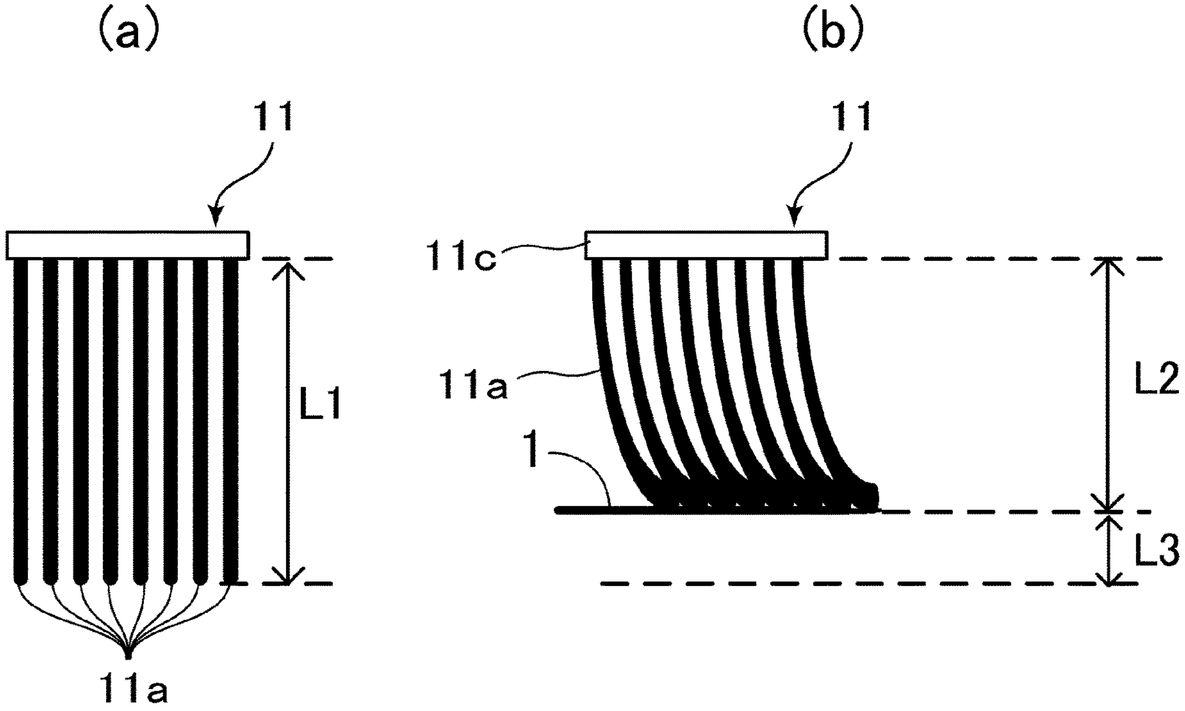

Part (a) of FIG. 3 is a diagram showing the brush member in a single state pertaining to the implementation form, and part (b) of FIG. 3 is a diagram showing the brush member in a state of contact with a photosensitive drum.

Figure 4:
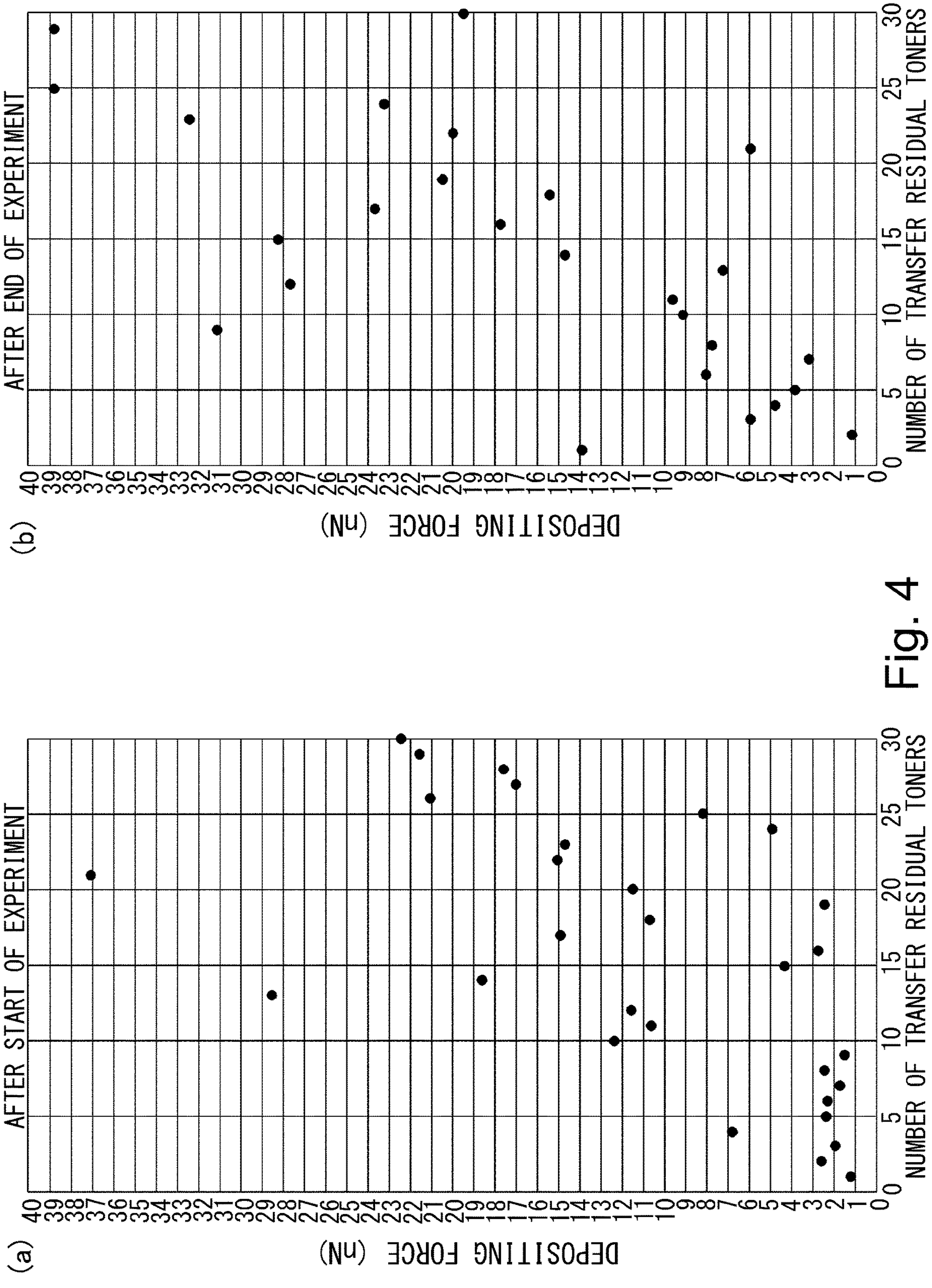

FIG. 4, parts (a) and (b), are diagrams showing measured results of a depositing force to the photosensitive drum of transfer residual toners.

DESCRIPTION OF THE EMBODIMENTS

In the following, an implementation form pertaining to the present disclosure will be specifically described with reference to Figures.

Figure 1:
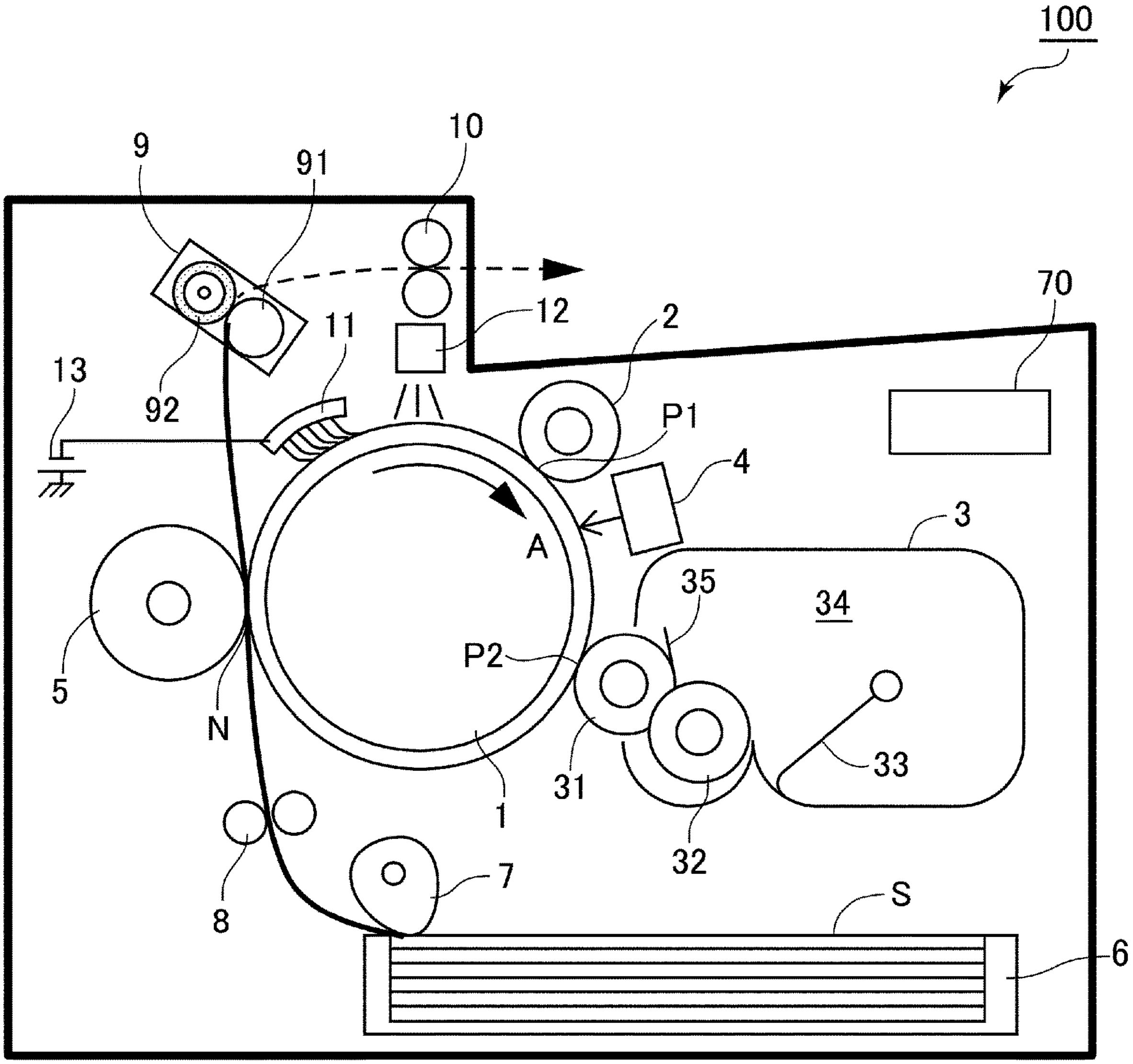
FIG. 1 is a schematic view of an image forming apparatus pertaining to an implementation form.

FIG. 1 shows a schematic structure of an image forming apparatus 100 pertaining to an example (an embodiment 1) of the implementation form of the present disclosure. The image forming apparatus 100 of the present embodiment is a monochrome printer.

The image forming apparatus 100 includes a cylindrical photosensitive member as an image bearing member, which is, in other words, a photosensitive drum 1. In the vicinity of the photosensitive drum 1, a charging roller 2 as a charging means and a developing device 3 as a developing means are provided. Further, an exposure device 4 as an exposure means is provided between the charging roller 2 and the developing device 3 in the Figure. Further, a transfer roller 5 is pressure-contacted to the photosensitive drum 1 as a transfer means.

The photosensitive drum 1 in the present embodiment is an organic photosensitive member which is negatively charged. The photosensitive drum 1 includes a photosensitive layer above the aluminum drum-shaped substrate. The photosensitive drum 1 is rotatable around an axis and is rotationally driven at a predetermined processing speed by a driving device (not shown) in a direction indicated by an arrow A in the Figure (in a clockwise direction in the Figure). In the present embodiment, the processing speed is equivalent to a peripheral velocity (a surface moving speed) of the photosensitive drum 1.

The charging roller 2 contacts the photosensitive drum 1 with a predetermined contact pressure and forms a charging portion P1. During image formation, a predetermined charging voltage is applied to the charging roller 2 by a charging high voltage power source (not shown) as a charging voltage source supply means so as to uniformly charge the surface of the photosensitive drum 1 with a predetermined voltage. In the present embodiment, the photosensitive drum 1 is charged with a negative polarity by the charging roller 2, and its charging potential (a surface potential of the photosensitive drum 1 immediately after it passes through the charging portion P1. A dark portion potential) is approximately −700 [V].

The exposure device 4 in the present embodiment is a laser scanner device which outputs a laser beam corresponding to image data inputted from an external device such as a host computer and scan-exposes a surface of the photosensitive drum 1. Through this exposure, an electrostatic latent image (an electrostatic image) corresponding to the image data is formed on the surface of the photosensitive drum 1. Incidentally, a potential of an exposed portion (a light part potential) in the present embodiment is approximately −100 [V]. Incidentally, the exposure device 4 is not limited to a laser scanner device; for example, an LED array with a plurality of LEDs arranged along a longitudinal direction (an axis direction of a cylinder) of the photosensitive drum 1 can be employed.

In the present embodiment, a contact developing method is used as a developing method. The developing device 3 includes a developing roller 31 as a developer carrying member, a toner supply roller 32 as a developer supply means, a developer accommodating chamber 34 which accommodates toner, a stirring member 33 which stirs the toner inside the developer accommodating chamber 34, and a developing blade 35. The toner (the developer), which is supplied from the developer accommodating chamber 34 by the toner supply roller 32 to the developing roller 31, is charged with a predetermined polarity by passing through a contact portion between the developing blade 35. Incidentally, the present embodiment uses toner with a particle diameter of 7 μm and a negative polarity as a regular charging polarity (a regular polarity). Further, in the present embodiment, a single-component, non-magnetic developer composed of toner was used for the developer; however, a two-component developer which includes non-magnetic toner and a magnetic carrier can be used for the developer. Further, a two-component, non-magnetic contact/non-contact development method can also be used.

The electrostatic latent image formed on the photosensitive drum 1 is developed as a toner image (a developer image) by toner which is conveyed by the developing roller 31 in an opposing portion (a developing portion P2) to the developing roller 31 and the photosensitive drum 1. During image formation, a −400V developing voltage is applied to the developing roller 31 by a developing voltage power source as a developing voltage applying means. In the present embodiment, the electrostatic latent image is developed using a reversal development method. In other words, the electrostatic latent image is developed as a toner image by adhering toner, which has been charged with the same polarity as the charging polarity of the photosensitive drum 1, to a portion of the surface of the photosensitive drum 1 after a charging process whose charge was attenuated due to exposure by the exposure device 4 (a light part).

For the transfer roller 5, materials which are composed of elastic members such as sponge rubber formed by polyurethane elastomer, EPDM (ethylene-propylene-diene rubber), or NBR (nitrile butadiene rubber) can be used as suited. The transfer roller 5 is pressed toward the photosensitive drum 1 so as to form a transfer portion N where the photosensitive drum 1 and the transfer roller 5 are pressure-contacted. An unshown transfer high voltage power source as a transfer voltage applying means is connected to the transfer roller 5, and a predetermined transfer voltage is applied to the transfer roller 5 at a predetermined timing. Incidentally, for example, a corona discharge method transfer device can be used as a direct transfer method transfer means.

In accordance with the timing in which the toner image formed on the photosensitive drum 1 arrives at the transfer portion N, a transfer material S, which is stored in a cassette 6, is fed by a feeding unit 7 and conveyed to the transfer portion N by passing through a registration roller pair 8. Incidentally, various sheet material of differing sizes and material, including paper such as plain paper and thick paper, plastic film, fabric, sheet material whose surface has been treated such as coated paper, and sheet material with special shapes such as envelopes and index paper can be used as the transfer material S, which is a recording material. The toner image formed on the photosensitive drum 1 is transferred to the transfer material S as the transfer body by the transfer roller 5 to which the transfer voltage has been applied.

The transfer material S to which the toner image has been transferred is conveyed to a fixing device 9 as a fixing means. The fixing device 9 in the present embodiment is a film heating method which includes a fixing film 91, which incorporates a fixing heater and a thermistor (not shown) that measures a temperature of the fixing heater, and a pressing roller 92 for pressure-contacting to the fixing film 91. The fixing device 9 performs the fixing process of the toner image by heating and pressing the transfer material S. The fixed transfer material S passes through a discharge roller pair 10 and is discharged to the outside of the image forming apparatus 100.

Between the transfer portion N and the charging portion P1, a pre-exposure device 12 is provided as a means to destaticize the surface potential of the photosensitive drum 1. This is done to obtain a uniform charging potential by leveling out an irregular potential in the photosensitive drum 1 after it passes through the transfer portion N so as to stabilize the discharge in the charging portion P1.

Further, transfer residual toners which are not transferred to the transfer material S and which remain in the photosensitive drum 1 are removed through the following process. Among the transfer residual toners, toners charged with positive polarity coexist with toners which do not include an electrical charge despite being charged with negative polarity. The transfer residual toners are charged again with negative polarity in the charging portion P1 due to discharge. The transfer residual toners which have been charged again with negative polarity in the charging portion P1 arrive at the developing device 3 with the rotation of the photosensitive drum 1.

Here, as mentioned above, the electrostatic latent image corresponding to the image data is formed on the surface of the photosensitive drum 1 arriving at the developing device 3. The actions of the transfer residual toners arriving at the developing device 3 will be described separately for the exposed portion and for a non-exposed portion of the photosensitive drum 1.

The transfer residual toners which adhere to the non-exposed portion of the photosensitive drum 1 are transferred to the developing roller 31 in the developing device 3 due to a potential difference between the non-exposed portion of the photosensitive drum 1 and the developing voltage, then are collected inside the developer accommodating chamber 34. Incidentally, the toner collected in the developer accommodating chamber 34 is used again for image formation.

On the other hand, the transfer residual toners which adhere to the exposed portion of the photosensitive drum 1 are not transferred to the developing roller 31 from the photosensitive drum 1 in the developing device 3; instead, the transfer residual toners move from the developing roller 31 to the transfer portion N with the developed toner and are transferred to the transfer material S, then are removed from the photosensitive drum 1. Consequently, the brush member described below is not the same as a brush member as a cleaning device (a drum cleaner) whose purpose is to remove the transfer residual toners from the photosensitive drum 1.

Further, a static charge on the photosensitive drum 1 after the transfer is removed by the aforementioned pre-exposure device 12, and the transfer residual toners can be charged with negative polarity by generating a uniform discharge at the time of discharge so as to stabilize the transfer residual toners. As a result, there is less toner that cannot be sufficiently recharged with a negative polarity, enabling a more reliable collection of the transfer residual toners in the developing device 3.

The image forming apparatus 100 can include a control portion 70. The control portion 70 is configured with a data processing device, which includes a processor, and a processing circuit such as FPGA and ASIC, and processes data related to operations of the image forming apparatus 100 based on programs and user instructions. The control portion 70, for example, performs controls such as voltage applying means controls and voltage controls such as charging voltages, developing voltages, transfer voltages, and collection voltages, exposure controls based on pre-exposure and image data, and controls of driving members such as photosensitive drums and various rollers. The control portion 70 can be configured so that a plurality of data processing devices operate in coordination with each other to perform these various processes.

[Paper Dust Collection Mechanism]

Next, the paper dust collection mechanism of the present embodiment will be described.

When the toner is transferred from the photosensitive drum 1 to the transfer material S in the transfer portion N, foreign matter such as paper fiber and filler included in the transfer material S, in other words, paper dust, may adhere to the photosensitive drum 1. In the cleanerless method employed in the present embodiment, if paper dust which has adhered to the photosensitive drum 1 is not processed at all, the paper dust will be collected by the developing device 3. In such a case, paper dust will cause image defects. For example, paper dust collected by the developing device 3 may get caught between the developing blade and the developing roller 31, and the toner on the developing roller 31 may be torn off, causing streaks in the image, or paper dust collected by the developing device 3 may obstruct a charging of the toner.

Further, when paper dust on the photosensitive drum 1 passes through the charging portion P1, there is a possibility that the paper dust may obstruct the charging of the photosensitive drum 1 by the charging roller 2, and the photosensitive drum 1 may not be sufficiently charged. In such a case, toner may adhere from the developing roller 31 to the surface region of the photosensitive drum 1, which was not sufficiently charged, and may be transferred to the transfer material S in the transfer portion N, causing an image defect with black spots. In particular, paper dust with a length of about 100 μm or more which has adhered to the photosensitive drum 1 may cause an image defect with black spots with a diameter of 100 μm or more which are visible to the human eye; hence, it is preferable to remove such paper dust from the photosensitive drum 1.

Accordingly, the present embodiment is provided with a brush member 11 as a paper dust collection member to remove paper dust which has adhered to the photosensitive drum 1. As indicated in FIG. 1, the brush member 11 is disposed on the downstream side of the transfer portion N in a rotational direction (arrow A) of the photosensitive drum 1, and on the upstream side of the charging portion P1 so as to contact the photosensitive drum 1. In other words, the brush member 11 in the present embodiment contacts the image bearing member in a position on the downstream side of the transfer portion N in a rotational direction of the image bearing member and on the upstream side of the developing portion P2.

FIG. 2(*a*) is a pattern diagram of the brush member 11 in a single state of not in contact with the photosensitive drum 1, as viewed from a free end side of the brush member 11 (a free end side of brush fibers 11*a*, a side which contacts the photosensitive drum 1). FIG. 2(*b*) is an enlarged view of a region A1, which is a portion of FIG. 2(*a*). In the present embodiment, a plane on the free end side of the brush member 11 has a length of 5 mm in a circumferential direction of the photosensitive drum 1 (a lateral direction of the brush member 11), and a length of 216 mm in a rotational axis direction of the photosensitive drum 1 (a longitudinal direction of the brush member 11). Further, the brush fibers 11*a* (base materials, bristle materials) are implanted so that the free end side of the brush fibers 11*a* are distributed approximately uniformly on the free end side of the brush member 11. The lengths of the brush member 11 in the longitudinal direction and the lateral direction are not limited to these lengths, and, for example, can be changed according to a maximum paper passing width of the image forming apparatus. The maximum paper passing width of the image forming apparatus is the largest width of the transfer material in the rotational axis direction of the photosensitive drum 1 among the transfer material which allows the image forming apparatus to form an image (to pass paper).

The brush member 11 includes the brush fibers 11*a*, such as conductive 6 nylon etc. as a plurality of base materials which rub the surface of the photosensitive drum 1, a base fabric which supports the brush fibers 11*a*, and supporting members such as sheet metal to paste and fix the base fabric. Incidentally, in addition to nylon, rayon, acrylic, and polyester etc. can be used as material for the brush fibers 11*a*. In the present embodiment, conductive brush fibers 11*a* are used; however, non-conductive brush fibers 11*a* can also be used. Further, for the manufacturing method of the brush, a cloth brush or a brush made using an electrostatic Flock method can be used.

For the supporting member of the brush member 11, a −400V bias voltage (a brush voltage) can be applied during the rotation of the photosensitive drum 1 by a brush power source 13 (FIG. 1) as a voltage applying means. Because this brush voltage has the same polarity as the regular charging polarity of the toner which has adhered to the photosensitive drum 1, it assists the toner on the photosensitive drum 1 to pass through without being collected. It is preferable that the value of the brush voltage be the same polarity as the regular charging polarity of the toner as the surface potential of the photosensitive drum 1 which has passed through the transfer portion N. Incidentally, the configuration can be such that the brush voltage is not applied to the brush member 11.

The brush member 11 is supported by the supporting member, and is disposed in a fixed position so that the brush member 11 fully contacts the photosensitive drum 1. With the rotation of the photosensitive drum 1, the brush member 11 is rubbed by the surface of the photosensitive drum 1 and collects paper dust on the photosensitive drum 1 by capturing the paper dust on the photosensitive drum 1 with the brush fibers 11*a* of the brush member 11.

However, if the brush fibers 11*a* scrape the transfer residual toners or fog toners from the photosensitive drum 1, the toners accumulate on the brush member 11. Furthermore, when the toner accumulated on the brush member 11 is discharged to the photosensitive drum 1 and is transferred to the recording material from the photosensitive drum 1 in the next transfer, an image defect may occur due to toner stain.

In order for the transfer residual toners and the fog toners on the photosensitive drum 1 to pass through the brush member 11 without being scraped by the brush member 11, it will suffice to reduce a contacting pressure per one brush fiber 11*a* (per one base material) of the brush member 11 against the photosensitive drum 1. As a result, the individual brush fibers 11*a* of the brush member 11 can each suppress the scraping of the transfer residual toners and the fog toners on the photosensitive drum 1. In particular, if the contacting pressure per one brush fiber 11*a* of the brush member 11 against the photosensitive drum 1 is less than a depositing force to the photosensitive drum 1 of the transfer residual toners and the fog toners on the photosensitive drum 1, the scraping of the transfer residual toners and the fog toners on the photosensitive drum 1 can be suppressed more reliably.

Further, it is demanded that the brush member 11 collect paper dust with a length of about 100 μm or more from the photosensitive drum 1 as it may cause visible image defects as described above.

In order for the brush member 11 to collect paper dust with a length of 100 μm or more from the photosensitive drum 1, it will suffice to increase the probability of the brush fibers 11*a* of the brush member 11 capturing (contacting) paper dust with a length of 100 μm on the photosensitive drum 1. Further, it would be better if paper dust could be scraped from the photosensitive drum 1 without the brush fibers 11*a* captured by the paper dust being dislodged by the paper dust.

FIG. 2(*b*) is an enlargement of the region A1, a rectangle enclosed by a dotted line shown in FIG. 2(*a*). In order to increase the probability of the brush fibers 11*a* capturing paper dust with a length of 100 μm on the photosensitive drum 1, it will suffice to have more than one brush fiber 11*a* exist on average inside a region A2 of a circle on the free end side of the brush member 11 (the free end side of the base materials) shown in FIG. 2(*b*). The region A2 is a region inside a circumference of a diameter of 100 μm. In other words, FIG. 2(*b*) is a schematization of a projected diagram which projects a free end of each brush fiber 11*a* on a plane which is perpendicular to a protruding direction of the brush fibers 11*a* (a normal direction of the base fabric) by means of a parallel ray which is parallel to the protruding direction relative to the base fabric. In this projected diagram, the average value of the number of the free ends of the brush fibers 11*a* positioned inside a circumference of a diameter of 100 μm (inside the region A2) shall be the average number of the base materials included in a circumference of a diameter of 100 μm when the brush member 11 is viewed from the free end side of the base materials (the brush fibers 11*a*). Incidentally, the brush fibers 11*a* have a thickness; as such, the position of the free end shall be based on the center of the free end (the face center).

In this way, if more than one brush fiber 11*a* exists on average inside a circumference of a diameter of 100 μm on the free end side of the brush member 11 (the free end side of the base materials), a plurality of the brush fibers 11*a* of the brush member 11 will contact paper dust with a length of 100 μm on the photosensitive drum 1. As a result, a plurality of the brush fibers 11*a* capture paper dust with a length of 100 μm on the photosensitive drum 1.

Further, it is preferable that a plurality of the brush fibers 11*a* exist on average inside a circumference of a diameter of 100 μm. As a result, paper dust can be scraped by the resultant force of a plurality of the brush fibers 11*a*, making it easier for the brush member 11 to scrape paper dust with a length of 100 μm on the photosensitive drum 1.

The present embodiment has a configuration in which the brush member 11 is indicated in Table 1; as a result, a contacting pressure f1, which is an average contacting pressure per one brush fiber 11*a* against the photosensitive drum 1, is approximately 0.98 (nN). Furthermore, a contacting pressure f2, which is a product of the average number of the brush fibers 11*a* which exist inside in a circumference of a diameter of 100 μm on the free end side of the brush member 11 (the free end side of the base materials) and the contacting pressure f1, was set to be approximately 2.85 (nN).

TABLE 1

| | Fiber material | Fiber length L1 (mm) | Entering amount L3 (mm) | Fineness (denier) | Density (kF/ inch^2) | Brush contacting pressure (N) | Contacting Pressure f1 per one fiber (nN) | Contacting pressure f2 inside 100 μm circumference (nN) | Average number of fibers inside 100 μm circumference | Assessment of paper dust collectivity | Assessment of toner discharge |
|---|---|---|---|---|---|---|---|---|---|---|---|
| Embd 1 | Nylon | 4.75 | 1.2 | 2 | 240 | 392 | 0.98 | 2.85 | 2.9 | ◎ | ◎ |
| Embd 2 | Nylon | 4.75 | 1.2 | 2 | 180 | 265 | 0.88 | 1.92 | 2.2 | ○ | ◎ |
| Embd 3 | Nylon | 4.75 | 1.2 | 2 | 320 | 623 | 1.16 | 4.53 | 3.9 | ◎ | ○ |
| Embd 4 | Nylon | 4.75 | 2.2 | 2 | 240 | 913 | 2.27 | 6.64 | 2.9 | ◎ | ○ |
| Embd 5 | Nylon | 4 | 1.2 | 2 | 240 | 641 | 1.60 | 4.66 | 2.9 | ◎ | ○ |
| Embd 6 | Acrylic | 4 | 0.5 | 2 | 200 | 294 | 0.88 | 2.14 | 2.4 | ○ | ◎ |
| Embd 7 | Nylon | 4.75 | 0.8 | 4 | 120 | 333 | 1.66 | 2.42 | 1.5 | ○ | ○ |
| Comp 1 | Acrylic | 4 | 1.2 | 2 | 200 | 1059 | 3.16 | 7.70 | 2.4 | ◎ | Δ |
| Comp 2 | Acrylic | 4 | 1.5 | 2 | 200 | 2040 | 6.09 | 14.83 | 2.4 | ◎ | X |
| Comp 3 | Nylon | 4.75 | 1.2 | 6 | 240 | 1320 | 3.29 | 9.59 | 2.9 | ◎ | Δ |
| Comp 4 | Nylon | 4.75 | 2.6 | 2 | 240 | 1128 | 2.81 | 8.20 | 2.9 | ◎ | Δ |

A fiber length L1 in Table 1, as shown in FIG. 3(*a*) is a length of the brush fibers 11*a* (the base length) when the brush member 11 is in a single state of not in contact with the photosensitive drum 1 etc. An entering amount L3 in Table 1 indicates a depth of contact of the base member 11 to the photosensitive drum 1. FIG. 3(*b*), is a pattern diagram of the brush member 11 in a state of contact with the photosensitive drum 1. The entering amount L3 is defined as a difference between a fiber length L1 when the brush member 11 is in a single state and a distance L2. The distance L2 is a distance from a fixing bearing surface of the base fabric on a supporting member 11*c* to the surface of the photosensitive drum 1 as measured in a protruding direction of the brush fiber 11*a* to the base fabric (a normal direction of the base fabric).

A fineness in Table 1 is an indicator which indicates a thickness of the brush fibers 11*a*, and a denier is a unit of a weight (g) per 9,000 meters of the brush fibers. The fineness indicates that, if the brush fibers 11*a* are the same material, the brush fibers 11*a* become thicker as the fineness increases.

A density in Table 1 indicates a density of the brush fibers 11*a* provided on the contacting surface of the brush member 11 to the photosensitive drum 1 indicated in FIG. 2, and (F/inch$^2$) is a unit which indicates the number of the brush fibers 11*a* per one square inch. Incidentally, 1 kF/inch$^2$ indicates a density of 1,000 brush fibers 11*a* per one square inch. Further, 1 inch is approximately 645 mm$^2$; therefore, the density of the number of the brush fibers 11*a* per one square millimeter can be obtained by dividing the value of the density in Table 1 by 645.

A brush contacting pressure in Table 1 is a contacting pressure of the brush member 11 against the photosensitive drum 1 when only a predetermined entering amount of the brush member 11 infiltrates the photosensitive drum 1. In the present embodiment, the brush contacting pressure was measured with an EZ-S manufactured by Shimazu Corporation and only allowing a predetermined entering amount of the brush member 11 to infiltrate the photosensitive drum 1.

The contacting pressure f1 in Table 1 is the average contacting pressure per one brush fiber 11*a* of the brush member 11 against the photosensitive drum 1 as described above. The contacting pressure f1 is calculated by calculating the total number of the brush fibers 11*a* of the brush member 11 from the density of the brush fibers 11*a* of the brush member 11 (kF/inch$^2$) and the area of the contacting surface of the brush member 11 to the photosensitive drum 1, then dividing this total number by the brush contacting pressure.

For the configuration of the brush member 11 in the present embodiment, 240 (kF/inch$^2$), which is a brush density, is unit converted to approximately 372 (brush fibers/square mm). For this reason, the contacting pressure is calculated as: contacting pressure f1=392 (N)/{372 (brush fibers/square mm)×width 5 (mm)×long dimension 216 (mm)}≈0.98 (nN).

The contacting pressure f2 in Table 1 is obtained by multiplying the average number of the brush fibers 11*a* included in a circumference of a diameter of 100 μm on the free end side of the brush member 11 (the free end side of the base materials), which is indicated in FIG. 2 as described above, by the contacting pressure f1.

For the configuration of the brush member 11 in the present embodiment, the average number of the brush fibers 11*a* of the brush member 11 included in a circumference of a diameter of 100 μm can be calculated by multiplying 372 (brush fibers/square mm), which is the brush density, by an area of a circle with a diameter of 100 μm. Specifically, the contacting pressure f2 is calculated as: contacting pressure f2=f1 (nN)×372 (brush fibers/square mm),×π×(50 μm)×(50 μm)÷10^6≈2.85 (nN).

(Verification Method)

The following experiment was conducted to verify the paper dust collectivity of the brush member 11 in the present embodiment, and a suppression of toner trouble caused by the transfer residual toners and the fog toners on the photosensitive drum 1 accumulating in the brush member 11.

For the configuration in each embodiment and each comparison example, Century Star paper was used for the transfer material S to print 5,000 jobs, in which 10 pages were printed per one print job; in other words, 50,000 pages were printed.

The paper dust collectivity was determined by confirming the occurrence frequency of black spots with a diameter of 0.1 mm or more which occurred on the transfer material S after printing. Some black spots with a diameter of 0.1 mm or more occurred from paper dust passing through the brush member 11; therefore, it can be determined that the paper dust collectivity of the brush member 11 increases as the occurrence frequency of black spots decreases.

Further, toner trouble was determined by confirming the occurrence frequency of toner stains which occurred on the transfer material S after printing. Toner stains occur when the toner discharged from the brush member 11 is transferred to the transfer material S; therefore, it can be determined that fewer cases of toner trouble are caused by the brush member 11 as the occurrence frequency of toner stains decreases. In Table 1, the paper dust collectivity is indicated as ◎ (good) if black spots did not occur, as ○ (possible) if black spots did not occur most of the time, as Δ (not possible) if black spots occurred occasionally, and as x (bad) if black spots occurred often. Incidentally, because the number of pages printed per one job by a user is often 10 pages or less, the number of print pages per one job is 10 pages according to an examination by the present inventors.

Furthermore, for the image forming apparatus in the present embodiment, the depositing force of the transfer residual toners adhering to the photosensitive drum 1 was measured twice: once at the beginning of the experiment and once after the end of the experiment. The measurement of the depositing force of the transfer residual toners on the photosensitive drum 1 was calculated from the acceleration of the transfer residual toners flying from the photosensitive drum 1 after oscillating the photosensitive drum 1 to which the transfer residual toners had adhered so as to add a predetermined acceleration to the transfer residual toners on the photosensitive drum 1. In other words, the depositing force to the photosensitive drum 1 of toner particles of the transfer residual toners shall be the product of the acceleration when the toner particles of the transfer residual toners fly from the photosensitive drum 1 and the average mass per one toner particle.

Further, the same experiment was conducted for a case in which the brush member 11 is used in embodiments 2 to 7 and comparison examples 1 to 4 shown in Table 1. For each embodiment and comparison example of the image forming apparatus, the configuration of the image forming apparatus is the same as in the embodiment 1, with the exception of the configuration of the brush member 11; therefore, descriptions will be omitted.

(Results)

As shown in Table 1, we can see that in the configuration of the brush member 11 in the embodiments 1 to 7, the brush member 11 includes a high paper dust collectivity while being able to prevent image defects caused by the fog toners and the transfer residual toners.

This is thought to be because, in each of the configurations in the embodiments 1 to 7, the contacting pressure f1, which is the average contacting pressure per one brush fiber 11*a* of the brush member 11 against the photosensitive drum 1, is generally less than the depositing force to the photosensitive drum 1 of the transfer residual toners on the photosensitive drum 1. If the depositing force of the contacting pressure f1 per one brush fiber 11*a* is less than the depositing force of the toner, the transfer residual toners and the fog toners on the photosensitive drum 1 can be scraped more easily from the photosensitive drum 1 by the brush fibers 11*a*.

In other words, there is less toner that passes through the brush member 11 while dislodging the brush fibers 11*a*. For this reason, it is thought that the brush member 11 accumulates less toner, and image defects caused by toner discharge occur less frequently.

FIG. 4, parts (a) and (b), shows the measurement results of the depositing force to the photosensitive drum 1 of the transfer residual toners on the photosensitive drum 1 measured at the beginning of the experiment and after the end of the experiment. The horizontal axis is the number of the transfer residual toners whose depositing force was measured, while the vertical axis is the measurement result of the depositing force to the photosensitive drum 1 of each transfer residual toner. As can be seen in FIG. 4, parts (a) and (b), at both the beginning of the experiment and after the end of the experiment, we can see that few of the transfer residual toners on the photosensitive drum 1 have a depositing force to the photosensitive drum 1 of about 2 (nN) or less, and hardly any of the transfer residual toners on the photosensitive drum 1 have a depositing force of about 1 (nN) or less.

Therefore, in the configurations of the embodiments 1 to 7, the contacting pressure f1 is less than the depositing force to the photosensitive drum 1 for most of the transfer residual toners on the photosensitive drum 1. For this reason, the transfer residual toners on the photosensitive drum 1 can pass through the brush member 11 without being scraped by the brush fibers 11*a*, and it is thought that image defects due to toner discharge did not occur.

Conversely, in the configurations of the comparison examples 1 to 4, the contacting pressure f1 is greater than the depositing force to the photosensitive drum 1 of some of the transfer residual toners on the photosensitive drum 1. For this reason, we can see that image defects occur due to the brush fibers 11*a* of the brush member 11 scraping the transfer residual toners on the photosensitive drum 1.

Here, the depositing force to the photosensitive drum 1 of individual toner particles of the transfer residual toners varies according to conditions such as a mass of the toner particles and their electric charge. Accordingly, if the contacting pressure f1 per one brush fiber 11*a* is less than the value of the bottom 15% (15/100 p-quartile) of the distribution of the depositing force to the photosensitive drum 1 of the transfer residual toners, the contacting pressure f1 shall be less than the depositing force of the transfer residual toners. On the other hand, if, the contacting pressure f1 per one brush fiber 11*a* is equal to or greater than the value of the bottom 15% (15/100 p-quartile) of the distribution of the depositing force to the photosensitive drum 1 of the transfer residual toners, the contacting pressure f1 shall be equal to or greater than the depositing force of the transfer residual toners. The distribution of the depositing force to the photosensitive drum 1 of the transfer residual toners is the distribution of the depositing force measured at the beginning of the experiment and after the end of the experiment using the aforementioned experiment method and the measurement method.

The contacting pressure f1 in the embodiment 4, which has the highest contacting pressure f1 among the embodiments 1 to 7, is 2.27 nN, and the contacting pressure f1 in the comparison example 4, which has the highest contacting pressure f1 among the comparison examples 1 to 4, was 2.81 nN. Further, for the 2 measurement results shown in FIG. 4, parts (a) and (b), among the 60 toner particles which were measurement targets, there were 5 toner particles whose depositing force to the photosensitive drum 1 was 2.27 nN (5/60≈8.3%) or less, and 11 toner particles whose depositing force to the photosensitive drum 1 was 2.81 nN (11/60≈18.3%) or less.

Therefore, using the aforementioned standard, if the contacting pressure f1 per one brush fiber 11*a* is less than the depositing force to the photosensitive drum 1 of the transfer residual toners, we can see that the occurrence of image defects caused by the brush fibers 11*a* by scraping the transfer residual toners on the photosensitive drum 1 and later discharging toner lumps can be suppressed.

Further, as can be seen from the assessment of the toner discharging properties of the embodiments 1 to 7, in order to reduce image defects caused by toner discharge from the brush member 11, it is preferable that the contacting pressure f1 be 2.3 nN or less. Further, in order to reduce image defects caused by toner discharge from the brush member 11, it is preferable that the contacting pressure f1 be 1.2 nN or less.

Next, the paper dust collectivity will be described. The reason for which the configurations in the embodiments 1 to 7 indicated a high paper dust collectivity is due to the existence of a plurality of the brush fibers 11*a* inside a circumference of a diameter of 100 μm on the free end side of the brush member 11 (the free end side of the base materials). In other words, in the embodiments 1 to 7, it is thought that paper dust with a length of 100 μm or more on the photosensitive drum 1 was collected more reliably by the brush member 11 because the paper dust was captured by a plurality of the brush fibers 11*a*.

Further, as can be seen from the assessment of the higher paper dust collectivity in the embodiments 1 to 7, in order to realize a higher paper dust collectivity, it is preferable that the contacting pressure f1 inside a circumference of a diameter of 100 μm be 1.9 nN or more; further, it is more preferable that the contacting pressure f2 be 2.8 nN or more.

Further, the higher the average number of the brush fibers 11*a* inside a circumference of a diameter of 100 μm, the more reliably the passing of paper dust, which causes visible image defects, can be prevented. If the average number of the brush fibers 11*a* inside a circumference of a diameter of 100 μm in Table 1 is 2.4, the assessment of the paper dust collectivity is inconsistent; however, in general, if the average number of the brush fibers is 2.4 or more, a favorable result concerning the paper dust collectivity was obtained. The more preferred average number of the brush fibers 11*a* inside a circumference of a diameter of 100 μm is 2.9 or more.

As described above, in the present implementation form, the contacting pressure f1, which is the average contacting pressure per one brush fiber 11*a* against the photosensitivity drum 1, is less than the depositing force to the photosensitivity drum 1 of the transfer residual toners on the photosensitivity drum 1. Further, in the present implementation form, a plurality of the brush fibers 11*a* exist inside a circumference of a diameter of 100 μm on the free end side of the brush member 11 (the free end side of the base materials). According to such a configuration, both an improvement in the paper dust collection performance of the brush member 11 and a reduction in image defects caused by toner discharge can be achieved.

An example using a monochrome printer was described in the above embodiment; however, the present technology can also be applied to a color printer using a direct transfer method. A color printer using a direct transfer method is, for example, an image forming apparatus provided with a plurality of processing units, each of which include an image bearing member (a photosensitive drum), which are arranged along a conveyance path of the recording material. In this case, a color image is formed on the recording material by successively transferring a toner image for each color, which is formed in each processing unit, to the recording material.

Further, in the aforementioned implementation form, the configuration of a direct transfer method, which transfers the toner image directly to the transfer material (the recording material) as the transfer body from the photosensitive drum 1 (the image bearing member), was described; however, the present technology can also be applied to an image forming apparatus using an intermediary transfer method. In an intermediary transfer method, a transfer member indicates, for example, a transfer roller (a primary transfer roller) which primary-transfers the toner image to an intermediary transfer body as a transfer body from the photosensitive drum 1 as an image bearing member. For the intermediary transfer body, an endless belt of belt members stretched across a plurality of rollers can be used. The toner image, to which the intermediary transfer body is primary-transferred, is secondary-transferred from the intermediary transfer body to a sheet (the recording material) by an intermediary transfer method such as a secondary transfer roller which forms a secondary transfer nip portion between the intermediary transfer body. In such a configuration of the intermediary transfer method, the same effect as the aforementioned implementation form can be obtained by replacing the transfer roller in the aforementioned implementation form with a primary transfer roller.

According to the present invention, both an improvement in the paper dust collection performance of the brush member and a reduction in image defects caused by toner discharge can be achieved.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-002365, filed Jan. 11, 2022, which is hereby incorporated by reference herein in its entirety.

What is claimed is:

1. An image forming apparatus comprising:

a rotatable image bearing member;

a developing member configured to develop an electrostatic latent image formed on the image bearing member using a developer at a developing portion;

a transfer member configured to transfer a developer image developed by the developing member from the image bearing member to a transferred member at a transfer portion; and a brush provided with a plurality of fibers contacting the image bearing member at a position of downstream of the transfer portion and upstream of the developing portion with respect to a rotational direction of the image bearing member, wherein the developer remaining on the surface of the image bearing member is collected in the developing portion, wherein an average contacting pressure of the brush per one fiber to the image bearing member is equal to or more than 1.2nN, and wherein a density of the fibers of the brush is equal to or more than 120kF/inch$^2$.

2. An image forming apparatus according to claim 1, wherein the average contacting pressure is equal to or more than 2.3nN.

3. An image forming apparatus according to claim 1, wherein the fibers of the brush have conductivity, and further comprising a voltage applying member configured to apply a voltage, having the same polarity as a normal charging polarity of the developer to a surface potential of the image bearing member passing through the transfer portion, to the brush.

4. An image forming apparatus according to claim 1, wherein the transferred member is a recording material.

5. An image forming apparatus according to claim 1, wherein the transferred member is an intermediary transfer member, and further comprising a secondary transfer member configured to transfer the toner image transferred on the intermediary transfer member to a recording material.

6. An image forming apparatus according to claim 1, further comprising a charging member configured to charge a surface of the image bearing member, wherein the charging member charges the surface of the image bearing member by contacting the surface of the image bearing member.

7. An image forming apparatus according to claim 1, wherein a density of the fibers of the brush is equal to or more than 240kF/inch$^2$.

* * * * *